United States Patent [19]

Katsuma et al.

[11] Patent Number: 4,719,378

[45] Date of Patent: Jan. 12, 1988

[54] BRUSHLESS MOTOR HAVING PERMANENT MAGNET ROTOR AND SALIENT POLE STATOR

[75] Inventors: Takashi Katsuma; Masao Kitoh, both of Iruma, Japan

[73] Assignee: Kabushiki Kaisha Yaskawa Denki Seisakasho, Kitakyushu, Japan

[21] Appl. No.: 899,752

[22] Filed: Aug. 21, 1986

Related U.S. Application Data

[63] Continuation-in-part of Ser. No. 723,889, Apr. 16, 1985, abandoned.

[30] Foreign Application Priority Data

Apr. 23, 1984 [JP] Japan .................................. 59-81504

[51] Int. Cl.$^4$ .............................................. H02K 29/06
[52] U.S. Cl. .................................... 310/67 R; 310/208
[58] Field of Search ................. 310/49 R, 67 R, 156, 310/162, 269, 184, 198, 208, 268, 269; 318/135, 254

[56] References Cited

U.S. PATENT DOCUMENTS

| | | | |
|---|---|---|---|
| 3,860,843 | 1/1975 | Kawasaki | 310/67 |
| 4,303,843 | 12/1981 | Arnoux et al. | 310/67 R |
| 4,455,516 | 6/1984 | Furusho | 310/156 |
| 4,634,912 | 1/1987 | Heyraud | 310/208 |

Primary Examiner—Patrick R. Salce
Assistant Examiner—D. L. Rebsch
Attorney, Agent, or Firm—Ladas & Parry

[57] ABSTRACT

In a brushless motor, the number of magnetic poles P and the number of salient poles S are identified by:

$$P = 2 \times (m \times k + l)$$

$$S = 2 \times m \times k$$

wherein m represents the number of phases and k represents an integer greater than 2. The windings wound about the k adjoining salient poles are made to belong to the same phase, but adjacent poles are oppositely wound.

1 Claim, 7 Drawing Figures

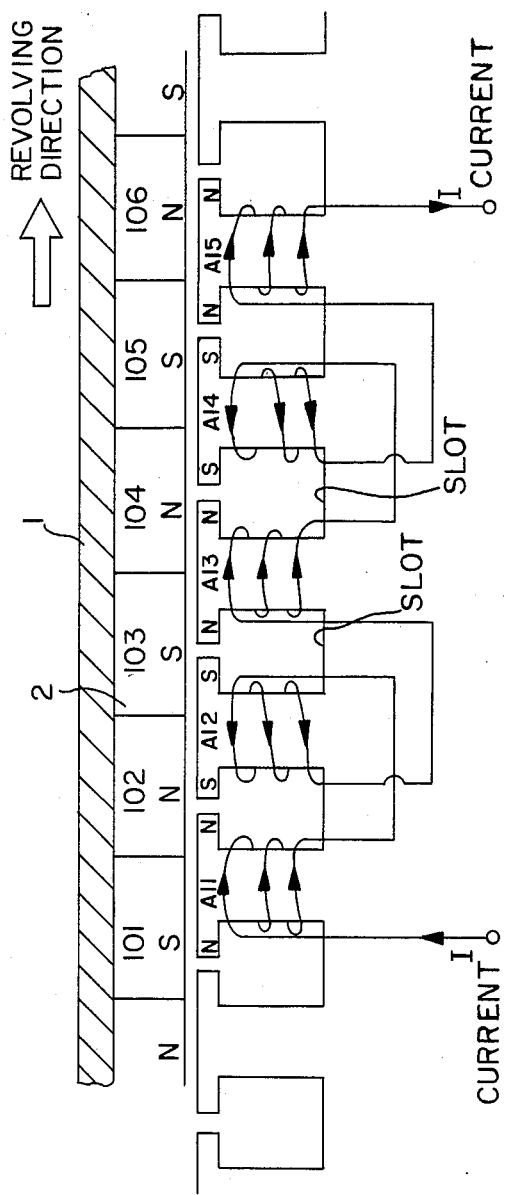

BRUSHLESS MOTOR HAVING PERMANENT MAGNET ROTOR AND SALIENT POLE STATOR

This application is a continuation-in-part of Ser. No. 723,889, filed Apr. 16, 1985, now abandoned.

BACKGROUND OF THE INVENTION

The present invention relates to a brushless motor of the type wherein permanent magnets are mounted on a rotor and windings are wound about the salient cores of a stator.

Generally, brushless motors of this type generate rotary magnetic fields by changing the phase of current passing through windings about a stator having salient poles for m phases.

The width of an induced voltage waveform equivalent to each torque constant should preferably be broad enough to make the torque imparted to the rotor large and to make the minimum torque ripples small.

In providing the windings on the stator core having the salient poles, a method of providing only windings belonging to the same phase on a single salient pole is effective to keep the coil ends from becoming superposed one upon another.

With such windings, however, the induced voltage waveform becomes largely dependent upon a relation between the width of the salient pole and that of the magnetic pole.

In a prior method as shown in FIG. 4, if the widths of the salient poles 3a, 3b, 3c, 3d, and so on, are made smaller than the widths of the magnetic poles 2a, 2b, 2c, and so on, then the waveform of an induced voltage V becomes like that shown in FIG. 5. The waveform has a large portion near to zero in the vicinity of the zero cross point and has a narrower width. Therefore, it brings about a problem that the effective value of torque becomes smaller.

However, if the widths of the salient poles 3a, 3b, and so on, are larger than those of the magnetic poles 2a, 2b, and so on, then the waveform of an induced voltage V also becomes like that shown in FIG. 5, resulting in the same problem as above.

Therefore, it is desirable to make the widths of the salient poles 3a, 3b, and so on, equal to the widths of the magnetic poles 2a, 2b, and so on.

Furthermore, on, condition that the widths of the salient poles 3a, 3b, and so on, are made almost equal to the widths of the magnetic poles 2a, 2b, and so on, the spaces between the salient poles 3a, 3b, and so on, about which the stator windings belonging to the same phase are also wound, are made equal to each other at an integral multiple of the space between the magnetic poles 2a, 2b, and so on. In this case, the adjoining salient poles 3a, 3b, and so on, must be arranged so as to have an angle corresponding to the electrical angle for the m phases. Therefore, there arises a problem the opening between the opposite tips of the adjoining salient poles becomes broad and the effective air gap becomes larger.

In particular, in a two-phase motor as shown in FIG. 6, for example, if the number of magnetic poles is set at P, the adjoining salient poles must have an electrical angle of an odd multiple of 90°. Thus, in order to make the widths of the magnetic poles 2a, 2b, and so on, equal to the widths of the salient poles 3a, 3b, and so on, at least an electrical angle of 270° [mechanical angle of 270°/(P/2)] must be ensured.

However, in this case, since the widths of the salient poles 3a, 3b, and so on, are equal to the widths of the magnetic poles 2a, 2b, and so on, the angle becomes one corresponding to an electrical angle of 180°. Therefore, the areas where the magnets 2a, 2b, and so on, face the cores 3a, 3b, and so on, become as small as 180°/270° = ⅔ to make the effective air gap larger and, thereby, degrade the characteristics of the motor.

SUMMARY OF THE INVENTION

It is therefore an object of the present invention to obviate the prior art problems and to provide an ideal brushless motor in which the number of magnetic poles P and the number of salient poles S are definitely related to one another and the number of adjoining salient poles, about which the windings belonging to the same phase are wound, is identified.

According to the present invention, the number of magnetic poles P and the number of salient poles S are identified by:

$$P = 2 \times (m \times k + 1)$$

$$S = 2 \times m \times k$$

wherein m represents the number of phases and k represents an integer greater than 2; and the windings wound about the k adjoining salient poles are made to belong to the same phase. By setting so, a brushless motor can be attained in which the minimum opening necessary for winding efficiently can be ensured; the widths of the magnetic poles and salient poles can be set equal to each other; and m-phase windings can be attained without adverse effects upon the induced voltage waveforms.

BRIEF DESRIPTION OF THE DRAWINGS

In the drawings:

FIG. 1a is a developed view of one part of the embodiment shown in FIG. 1.

DESCRIPTION OF PREFERRED EMBODIMENTS

Preferred embodiments of the present invention will now be described with reference to FIGS. 1-3.

Figure 1:
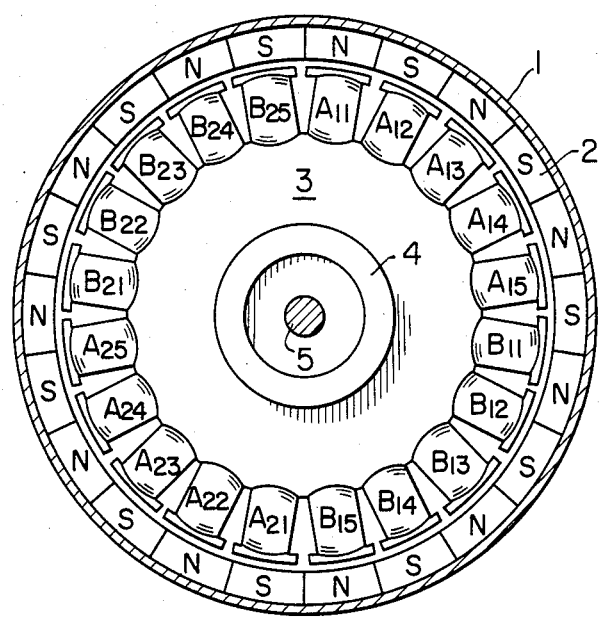
FIG. 1 is a cross sectional front view of an embodiment of the brushless motor according to the present invention.

FIG. 1 shows a cross sectional front view of an embodiment of the brushless motor according to the present invention.

Figure 2:
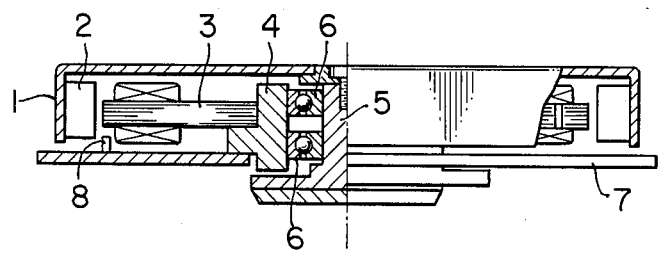
FIG. 2 is a side elevational view cut away in part of FIG. 1.

FIG. 2 is a side cut away in part view of FIG. 1.

A rotor yoke 1 is fixed to a shaft 5 and supported by a housing 4 via a bearing 6 so that the rotor yoke 1 is rotatable about the shaft 5.

A rotor magnet 2 having 22 poles is mounted on the rotor yoke 1. A stator core 3 having 20 salient poles is disposed facing the rotor magnet 2. A circuit board 7 with a magnetic pole detection element 8 and motor drive circuit mounted thereon is attached to the stator core 3 which is fixed to the housing 4.

Windings for two-phase, i.e., A-phase and B-phase windings, are wound about the stator core 3. Groups of five adjoining salient poles, such as $A_{11}$ to $A_{15}$, $B_{11}$ to $B_{15}$, $A_{21}$ to $A_{25}$, $B_{21}$ to $B_{25}$, are respectively provided with windings for the same phase, all the windings being symmetrically disposed with the relative angle of 180° to the same phase.

In the present embodiment, although the width of the salient pole is set about 85% of the width of the magnetic pole due to restrictions on the width of an opening, the leading edge portion of the waveform in the vicinity of the zero cross point is immensely improved as compared with the waveform corresponding to a single salient pole. This is because the waveform is composed of waveforms obtained, for example, from $A_{11}$ to $A_{15}$, the angles of which are electrically shifted (in this embodiment, by an electrical angle of 18°).

In addition, since the same phases locate symmetrically, spaced by 180°, a balanced force is applied. Further, due to the division, i.e., k=5, the inductance is small and the coil ends can be made smaller.

Also, the cogging torque has a number of ripples, 220 per one rotation, the number 220 being the least common multiple between the number of salient poles, 20, and the number of magnetic poles, 22. As a result, the cogging torque is extremely small, i.e. almost equal to zero.

Figure 3:
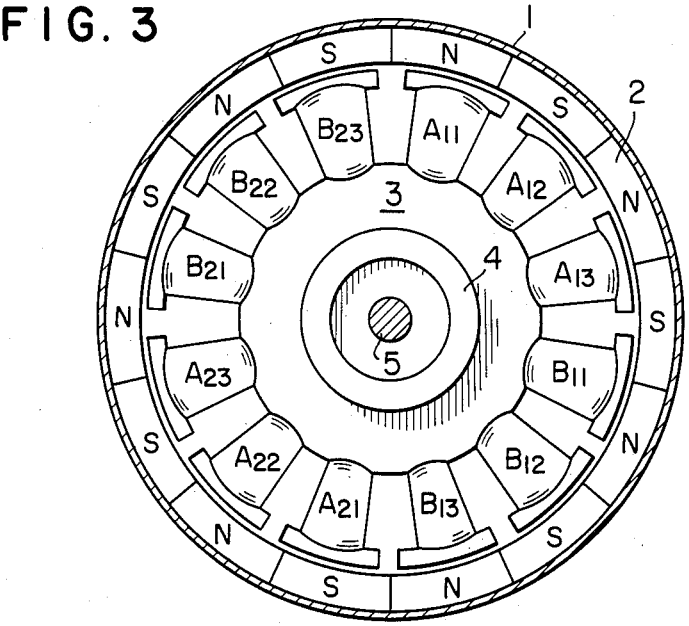
FIG. 3 is a cross sectional front view of another embodiment of the brushless motor according to the present invention.
Figure 4:
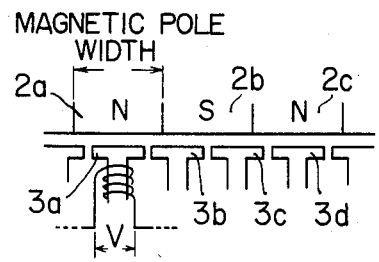
FIG. 4 is a view for explaining one example of the prior art brushless motor.
Figure 5:
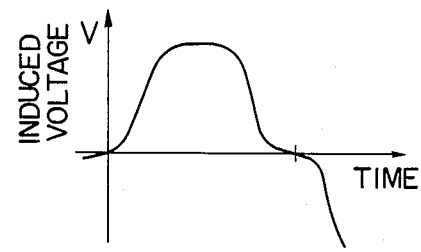
FIG. 5 is a graph showing an induced voltage waveform according to FIG. 4.
Figure 6:
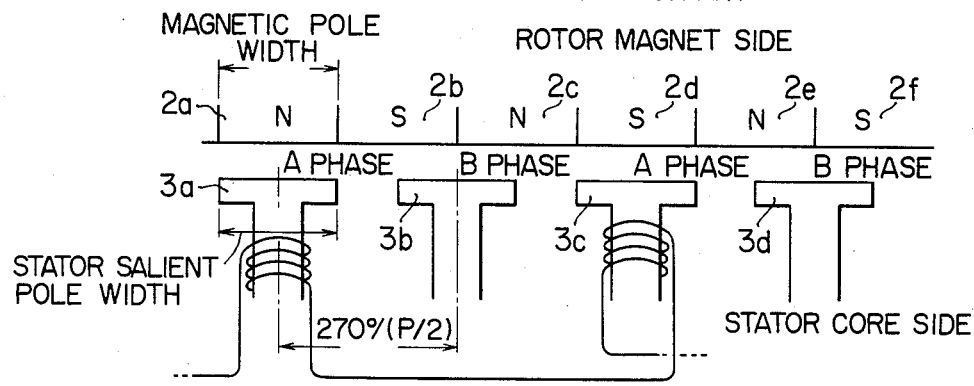
FIG. 6 is a developed view of another example of the prior art brushless motor.

The cross sectional front view of another embodiment of the present invention is shown in FIG. 3.

In all of the figures, identical numbers or references designate similar or corresponding parts.

In the embodiment, the numbers of phases, magnetic poles, and salient poles are respectively set as 2, 14, and 12, and the widths of the magnetic poles and salient poles are set substantially equal to each other.

It is shown in FIG. 1a that the rotor magnets 2 opposing A-phase windings $A_{11}$ to $A_{15}$ are designated by reference numerals 101 to 106.

When the slots encasing the winding $A_{13}$ are brought to positions aligning with the center lines of the rotor magnets 103 and 104 as shown in FIG. 1a, and all the A-phase windings $A_{11}$ to $A_{15}$ are energized by an A-phase current I flowing in the arrowmarked direction, the left half of the N pole excited by the winding $A_{13}$ attracts the rotor magnet 103 of a polarity S. At the same time, the right half of N pole excited by the winding $A_{13}$ repels the rotor magnet 104 of a polarity N rightwardly. Likewise, an attracting force and a repelling force are exerted between the pole excited by the winding $A_{12}$ and the rotor magnets 102 and 103, the pole excited by the winding $A_{11}$ and the rotor magnets 101 and 102, the pole excited by the winding $A_{14}$ and the rotor magnets 104 and 105, and the pole excited by the winding $A_{15}$ and the rotor magnets 105 and 106, so that the rotor magnets 101 to 106 are all driven rightwardly.

The other set of A-phase windings $A_{21}$ to $A_{25}$, which are displaced 180° from the aforementioned A-phase windings $A_{11}$ to $A_{15}$ as shown in FIG. 1, are energized in a manner such that A-phase winding $A_{21}$ provides S pole, A-phase winding $A_{22}$ provides N pole, and so forth. Because the polarity of the rotor magnets opposing the A-phase windings $A_{21}$ to $A_{25}$ is just the reverse (see FIG. 1) of those opposing the A-phase windings $A_{11}$ to $A_{15}$ as described above, similar attracting forces and repelling forces are created as described hereinbefore with reference to FIG. 1a, and the rotor is rotated rightwardly, in the clockwise direction, as shown in FIG. 1.

The positions of the B-phase windings $B_{11}$ to $B_{15}$ and $B_{21}$ to $B_{25}$ are displaced 90° from the A-phase windings $A_{11}$ to $A_{15}$ and $A_{21}$ to $A_{25}$, respectively, and the B-phase current flowing through the B-phase windings is also displaced by an electric angle of 90° from the A-phase current flowing through the A-phase windings. Therefore, the brushless motor described here operates as a two-phase motor.

Although the above embodiments have been described in association with an outer rotor type motor, an inner type motor is also applicable in the same way.

According to the present invention, even if the stator windings are collectively provided, the induced voltage waveform is not degraded; an effective use of magnetic flux is ensured; and a compact and high efficiency brushless motor can be obtained.

We claim:

1. A brushless motor having a rotor magnet with a number of P of magnetic poles and a stator core facing the rotor magnet across an air gap, the stator core having a number S of salient poles about which stator windings are respectively wound for m phases, the rotor magnet being driven into rotation by detecting the rotary position of the rotor magnet relative to the stator core and by sequentially changing over phase currents passing through the stator windings, wherein said numbers P and S are defined as $P=2\times(m\times k+1)$ $S=2\times m\times k$ wherein k represents an integer greater than 2, and each said salient pole having said stator windings of only one phase and $2\times m$ salient groups of k said salient poles, each said salient pole of each group having said stator windings of the same phase, the direction of winding varying for alternate salient poles.

* * * * *